(12) United States Patent
Wang et al.

(10) Patent No.: US 10,013,588 B2
(45) Date of Patent: Jul. 3, 2018

(54) ENCODED INFORMATION READING TERMINAL WITH MULTI-DIRECTIONAL ANTENNA

(75) Inventors: Ynjiun Paul Wang, Cupertino, CA (US); Huyu Qu, San Jose, CA (US); Chen Feng, Morristown, NY (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 1431 days.

(21) Appl. No.: 13/211,568

(22) Filed: Aug. 17, 2011

(65) Prior Publication Data

US 2013/0043981 A1 Feb. 21, 2013

(51) Int. Cl.
| | | |
|---|---|---|
| G06K 7/10 | (2006.01) | |
| G06K 19/07 | (2006.01) | |
| G06K 7/00 | (2006.01) | |
| H01Q 1/22 | (2006.01) | |
| H01Q 15/00 | (2006.01) | |

(52) U.S. Cl.
CPC ....... *G06K 7/10356* (2013.01); *G06K 7/0008* (2013.01); *G06K 7/10079* (2013.01); *G06K 7/10089* (2013.01); *G06K 7/10386* (2013.01); *G06K 19/0723* (2013.01); *H01Q 1/2216* (2013.01); *H01Q 15/0086* (2013.01)

(58) Field of Classification Search
CPC ............. G06K 19/0723; G06K 7/0008; G06K 7/10356; G06K 7/10089; G06K 7/10386; G06K 7/10079; H01Q 15/0086; H01Q 1/2216
USPC ....... 340/10.1, 10.3, 10.4, 10.5, 10.6, 572.1, 340/572.4; 235/380, 385, 492, 379; 342/200; 343/876; 370/310; 455/415, 455/456.1; 705/17; 706/46
See application file for complete search history.

(56) References Cited

U.S. PATENT DOCUMENTS

| | | | | |
|---|---|---|---|---|
| 5,231,273 A | * | 7/1993 | Caswell et al. | ............... 235/385 |
| 5,579,341 A | | 11/1996 | Smith et al. | |
| 5,589,844 A | * | 12/1996 | Belcher et al. | ............... 343/860 |
| 5,786,764 A | * | 7/1998 | Engellenner | ............... 340/572.4 |
| 5,812,605 A | | 9/1998 | Smith et al. | |
| 5,903,825 A | | 5/1999 | Goode et al. | |
| 6,167,099 A | | 12/2000 | Rader et al. | |
| 6,751,470 B1 | | 6/2004 | Ella et al. | |

(Continued)

FOREIGN PATENT DOCUMENTS

| | | |
|---|---|---|
| CN | 1755704 A | 4/2006 |
| CN | 101038618 A | 9/2007 |

(Continued)

OTHER PUBLICATIONS

B.P. Otis, Y.H. Chee, R. Lu, N.M. Pletcher, J.M. Rabaey, "An Ultra-Low Power MEMS-Based Two-Channel Transceiver for Wireless Sensor Networks," (4 pages).

(Continued)

*Primary Examiner* — Mohamed Barakat
(74) *Attorney, Agent, or Firm* — Oliff PLC; R. Brian Drozd

(57) ABSTRACT

An encoded information reading terminal can comprise a microprocessor, a memory communicatively coupled to the microprocessor, a radio frequency identifier (RFID) reading device, and two antennas having substantially different spatial orientation. A switching circuit can be configured to alternatively electrically couple one of the antennas to the RFID reading device.

19 Claims, 11 Drawing Sheets

(56) References Cited

U.S. PATENT DOCUMENTS

| | | |
|---|---|---|
| 6,911,945 B2 | 6/2005 | Korva |
| 6,937,196 B2 | 8/2005 | Korva |
| 6,961,544 B1 | 11/2005 | Hagstrom |
| 7,072,690 B2 | 7/2006 | Shin et al. |
| 7,161,357 B2 | 1/2007 | Lee et al. |
| 7,190,257 B2 * | 3/2007 | Maltseff et al. ............ 340/10.51 |
| 7,190,728 B2 | 3/2007 | Kawada et al. |
| 7,202,776 B2 | 4/2007 | Breed |
| 7,202,819 B2 | 4/2007 | Hatch |
| 7,218,678 B2 | 5/2007 | Katta et al. |
| 7,251,499 B2 | 7/2007 | Ella et al. |
| 7,265,731 B2 | 9/2007 | Vance et al. |
| 7,283,094 B2 | 10/2007 | Lee |
| 7,307,331 B2 | 12/2007 | Kipnis et al. |
| 7,333,067 B2 | 2/2008 | Hung et al. |
| 7,368,311 B2 | 5/2008 | Tilmans et al. |
| 7,423,599 B2 | 9/2008 | Li et al. |
| 7,446,717 B2 | 11/2008 | Hung et al. |
| 7,466,274 B2 | 12/2008 | Lin et al. |
| 7,586,387 B2 | 9/2009 | Van Delden |
| 7,592,957 B2 | 9/2009 | Achour et al. |
| 7,617,342 B2 | 11/2009 | Rofougaran |
| 7,696,929 B2 | 4/2010 | Kaneda |
| 7,741,965 B2 | 6/2010 | Lai et al. |
| 7,750,435 B2 | 7/2010 | Rofougaran et al. |
| 7,764,232 B2 | 7/2010 | Achour et al. |
| 7,795,700 B2 | 9/2010 | Rofougaran et al. |
| 7,809,329 B2 | 10/2010 | Rofougaran et al. |
| 7,835,157 B2 | 11/2010 | Tilmans et al. |
| 7,839,216 B2 | 11/2010 | Alidio et al. |
| 7,839,236 B2 | 11/2010 | Dupuy et al. |
| 7,847,739 B2 | 12/2010 | Achour et al. |
| 7,855,696 B2 | 12/2010 | Gummalla et al. |
| 7,874,483 B2 | 1/2011 | Wang et al. |
| 7,885,600 B2 | 2/2011 | Rofougaran et al. |
| 7,893,790 B2 | 2/2011 | Van Delden |
| 7,899,394 B2 | 3/2011 | Rofougaran et al. |
| 7,903,724 B2 | 3/2011 | Rofougaran et al. |
| 7,908,420 B2 | 3/2011 | Rofougaran et al. |
| 8,258,956 B1 * | 9/2012 | Kuzma et al. ............ 340/572.1 |
| 8,287,327 B1 * | 10/2012 | Ghaly ...................... 446/297 |
| 2002/0055368 A1 | 5/2002 | Lee |
| 2002/0183013 A1 | 12/2002 | Auckland et al. |
| 2004/0249915 A1 | 12/2004 | Russell |
| 2005/0128152 A1 | 6/2005 | Milosavljevic |
| 2005/0156796 A1 | 7/2005 | Nysen |
| 2005/0271133 A1 | 12/2005 | Waxman |
| 2005/0285742 A1 * | 12/2005 | Charych et al. ............ 340/572.1 |
| 2006/0025102 A1 | 2/2006 | Kipnis et al. |
| 2006/0070089 A1 | 3/2006 | Shoaib et al. |
| 2006/0077039 A1 * | 4/2006 | Ibi et al. .................... 340/10.1 |
| 2006/0128332 A1 | 6/2006 | van Rooyen et al. |
| 2006/0131377 A1 * | 6/2006 | Zimmerman ................ 235/375 |
| 2006/0135084 A1 | 6/2006 | Lee |
| 2006/0261821 A1 | 11/2006 | Lee et al. |
| 2006/0261938 A1 | 11/2006 | Lai et al. |
| 2006/0279446 A1 | 12/2006 | Wang et al. |
| 2007/0060089 A1 | 3/2007 | Owen et al. |
| 2007/0138260 A1 * | 6/2007 | Keys .............................. 235/380 |
| 2007/0194929 A1 * | 8/2007 | Wagner et al. ............ 340/572.7 |
| 2007/0257847 A1 | 11/2007 | Su et al. |
| 2008/0042847 A1 | 2/2008 | Hollister et al. |
| 2008/0048917 A1 | 2/2008 | Maha et al. |
| 2008/0076383 A1 | 3/2008 | Barrett et al. |
| 2008/0102805 A1 * | 5/2008 | Balia et al. ................... 455/415 |
| 2008/0107213 A1 | 5/2008 | Gupta et al. |
| 2008/0150807 A1 | 6/2008 | Lin et al. |
| 2008/0150829 A1 | 6/2008 | Lin et al. |
| 2008/0157897 A1 | 7/2008 | Tilmans et al. |
| 2008/0181186 A1 | 7/2008 | Rofougaran et al. |
| 2008/0181287 A1 | 7/2008 | Rofougaran et al. |
| 2008/0182613 A1 | 7/2008 | Rofougaran et al. |
| 2008/0237341 A1 | 10/2008 | Fleck et al. |
| 2008/0258981 A1 | 10/2008 | Maha et al. |
| 2008/0258993 A1 | 10/2008 | Gummalla et al. |
| 2008/0278370 A1 * | 11/2008 | Lachner et al. ............. 342/200 |
| 2008/0297404 A1 | 12/2008 | Lin et al. |
| 2009/0006677 A1 | 1/2009 | Rofougaran et al. |
| 2009/0024550 A1 * | 1/2009 | Wynn et al. .................... 706/46 |
| 2009/0028082 A1 | 1/2009 | Wynn et al. |
| 2009/0032592 A1 | 2/2009 | Christensen |
| 2009/0033359 A1 | 2/2009 | Rofougaran et al. |
| 2009/0036067 A1 | 2/2009 | Rofougaran et al. |
| 2009/0037627 A1 | 2/2009 | Rofougaran et al. |
| 2009/0058734 A1 | 3/2009 | Ali et al. |
| 2009/0067388 A1 | 3/2009 | van Rooyen et al. |
| 2009/0073065 A1 | 3/2009 | Jordan |
| 2009/0074106 A1 | 3/2009 | See et al. |
| 2009/0115549 A1 | 5/2009 | Lee |
| 2009/0121951 A1 | 5/2009 | Kaneda |
| 2009/0128446 A1 | 5/2009 | Gummalla et al. |
| 2009/0135087 A1 | 5/2009 | Gummalla et al. |
| 2009/0148074 A1 | 6/2009 | Xu et al. |
| 2009/0160575 A1 | 6/2009 | Dupuy et al. |
| 2009/0160578 A1 | 6/2009 | Achour |
| 2009/0167457 A1 | 7/2009 | Melde et al. |
| 2009/0180403 A1 | 7/2009 | Tudosoiu |
| 2009/0218657 A1 | 9/2009 | Rofougaran et al. |
| 2009/0219213 A1 | 9/2009 | Lee et al. |
| 2009/0227205 A1 | 9/2009 | Rofougaran et al. |
| 2009/0237321 A1 * | 9/2009 | Lin ........................ H01Q 21/28 343/893 |
| 2009/0245146 A1 | 10/2009 | Gummalla et al. |
| 2009/0251385 A1 | 10/2009 | Xu et al. |
| 2009/0285135 A1 | 11/2009 | Rousu et al. |
| 2009/0289737 A1 | 11/2009 | Itoh et al. |
| 2009/0295473 A1 | 12/2009 | Dupuy et al. |
| 2009/0295483 A1 | 12/2009 | Alidio et al. |
| 2009/0295660 A1 | 12/2009 | Xu et al. |
| 2009/0316612 A1 | 12/2009 | Poilasne et al. |
| 2009/0322490 A1 | 12/2009 | Kung et al. |
| 2009/0323783 A1 | 12/2009 | Buris et al. |
| 2010/0013603 A1 * | 1/2010 | Chatani et al. ............. 340/10.6 |
| 2010/0019035 A1 * | 1/2010 | Larson et al. ................ 235/385 |
| 2010/0022195 A1 | 1/2010 | Rofougaran et al. |
| 2010/0045554 A1 | 2/2010 | Xu et al. |
| 2010/0060544 A1 * | 3/2010 | Penev et al. .................. 343/876 |
| 2010/0073254 A1 | 3/2010 | Lee et al. |
| 2010/0077115 A1 | 3/2010 | Rofougaran et al. |
| 2010/0079347 A1 | 4/2010 | Hayes et al. |
| 2010/0109805 A2 | 5/2010 | Achour |
| 2010/0109971 A2 | 5/2010 | Gummalla et al. |
| 2010/0109972 A2 | 5/2010 | Xu et al. |
| 2010/0110943 A2 | 5/2010 | Gummalla et al. |
| 2010/0117908 A2 | 5/2010 | Lee et al. |
| 2010/0123635 A1 | 5/2010 | Lopez et al. |
| 2010/0127085 A1 | 5/2010 | Yamagajo et al. |
| 2010/0157858 A1 | 6/2010 | Lee et al. |
| 2010/0171563 A1 | 7/2010 | Dupuy et al. |
| 2010/0176880 A2 | 7/2010 | Dupuy et al. |
| 2010/0207703 A1 | 8/2010 | Dupuy et al. |
| 2010/0207738 A1 * | 8/2010 | Bloy ............................ 340/10.3 |
| 2010/0225554 A1 | 9/2010 | Huang et al. |
| 2010/0231464 A1 | 9/2010 | Huang et al. |
| 2010/0231470 A1 | 9/2010 | Lee et al. |
| 2010/0232474 A1 | 9/2010 | Rofougaran et al. |
| 2010/0238075 A1 | 9/2010 | Pourseyed |
| 2010/0238081 A1 | 9/2010 | Achour et al. |
| 2010/0276498 A1 * | 11/2010 | Rofougaran ................. 235/492 |
| 2010/0283692 A1 | 11/2010 | Achour et al. |
| 2010/0283705 A1 | 11/2010 | Achour et al. |
| 2010/0285634 A1 | 11/2010 | Rofougaran et al. |
| 2011/0026624 A1 | 2/2011 | Gummalla et al. |
| 2011/0039501 A1 | 2/2011 | Achour et al. |
| 2011/0050364 A1 | 3/2011 | Achour |
| 2011/0066774 A1 | 3/2011 | Rofougaran et al. |
| 2011/0068873 A1 | 3/2011 | Alidio et al. |
| 2011/0090057 A1 * | 4/2011 | Kosecki et al. ............. 340/10.1 |
| 2011/0095950 A1 | 4/2011 | Yu |
| 2011/0095964 A1 | 4/2011 | Pathak et al. |
| 2011/0109402 A1 | 5/2011 | Dupuy et al. |
| 2011/0116424 A1 * | 5/2011 | Sauerwein et al. .......... 370/310 |
| 2011/0136457 A1 | 6/2011 | Yu |
| 2011/0148586 A1 | 6/2011 | Anderson et al. |

(56) References Cited

U.S. PATENT DOCUMENTS

| | | | |
|---|---|---|---|
| 2011/0153349 A1 | 6/2011 | Anderson et al. | |
| 2011/0174877 A1 | 7/2011 | Fleck et al. | |
| 2011/0183688 A1* | 7/2011 | Dietrich et al. | 455/456.1 |
| 2012/0055988 A1* | 3/2012 | Qu et al. | 235/380 |
| 2012/0075076 A1* | 3/2012 | Wang | 340/10.4 |
| 2012/0092134 A1* | 4/2012 | Stern et al. | 340/10.1 |
| 2012/0193411 A1* | 8/2012 | Smith | 235/379 |
| 2012/0206238 A1* | 8/2012 | Lavedas | 340/10.1 |
| 2012/0223811 A1* | 9/2012 | Wild et al. | 340/10.1 |
| 2012/0313757 A1* | 12/2012 | Volpi et al. | 340/10.1 |
| 2013/0043981 A1* | 2/2013 | Wang et al. | 340/10.1 |
| 2013/0054390 A1* | 2/2013 | Kerchner et al. | 705/17 |

FOREIGN PATENT DOCUMENTS

| | | |
|---|---|---|
| CN | 101414364 A | 4/2009 |
| CN | 102034065 A | 4/2011 |
| EP | 1 643 413 A2 | 4/2006 |
| EP | 2061285 A2 | 5/2009 |
| EP | 2 202 891 A1 | 6/2010 |
| WO | WO-9814023 A1 | 4/1998 |
| WO | WO 00/14694 A1 | 3/2000 |

OTHER PUBLICATIONS

C.T.-C Nguyen, "Vibrating RF MEMS for Low Power Communications (invited)," Proceedings, 2002 MRS Fall Meeting, Boston, Massachusetts, Dec. 2-6, 2002, pp. J12.1.1-J2.1.12 (12 pages).

European Patent Office, European Patent Application No. 10191449.1, Communication Extended Search Report, dated Feb. 21, 2011 (11 pages).

European Patent Office, Partial European Search Report, European Patent Application No. 10176444.7, dated Feb. 11, 2011 (8 pages).

Hawaii International Conference on, IEEE, Piscataway, NJ, USA, Dynamic Dispatching and Transport Optimization—Real-World Experience with Perspectives on Pervasive Technology Integration, dated Jan. 5, 2009 (9 pages).

S. Lee and C.T.-C Nguyen, "Influence of Automatic Level Control on Micromechanical Resonator Oscsillator Phase Noise," proceedings, 2003 IEEE Int. Frequency Control Symposium, Tampa, Florida, May 5-8, 2003, pp. 341-349. (9 pages).

State Intellectual Property Office, P.R. China, Notice of Amendment, Chinese Application No. 201010544113.X, dated Dec. 7, 2010, (2 pages).

www.nano.gatech.edu/news/release.php, Georgia Institute of Technology: Nanoscience and Nanotechnology, "Researchers Win $3.5 Million to Improve Wireless," Website, Aug. 5, 2010, (3 pages).

U.S. Appl. No. 12/621,914, filed Nov. 19, 2009.

U.S. Appl. No. 12/567,158, filed Nov. 19, 2009 (35 pages).

U.S. Appl. No. 13/211,555, filed Aug. 17, 2011 (41 pages).

U.S. Appl. No. 13/211,575, filed Aug. 17, 2011 (27 pages).

EPC Global, Specification for RFID AIR Interface, dated Jan. 31, 2005 (94 pages).

European Patent Office, European Search Report, European Patent Application No. 10176444.7, dated Jun. 6, 2011 (5 pages).

Jun. 10, 2014 Partial Search Report issued in European Patent Application No. 12178927.5.

Sep. 28, 2014 Office Action issued in European Patent Application No. 12 178 927.5.

Jun. 1, 2016 Office Action issued in Chinese Patent Application No. 201210291709.2.

May 16, 2017 Office Action issued in Chinese Patent Application No. 201210291709.2.

Jan. 13, 2017 Office Action issued in Chinese Patent Application No. 20121029709.2.

* cited by examiner

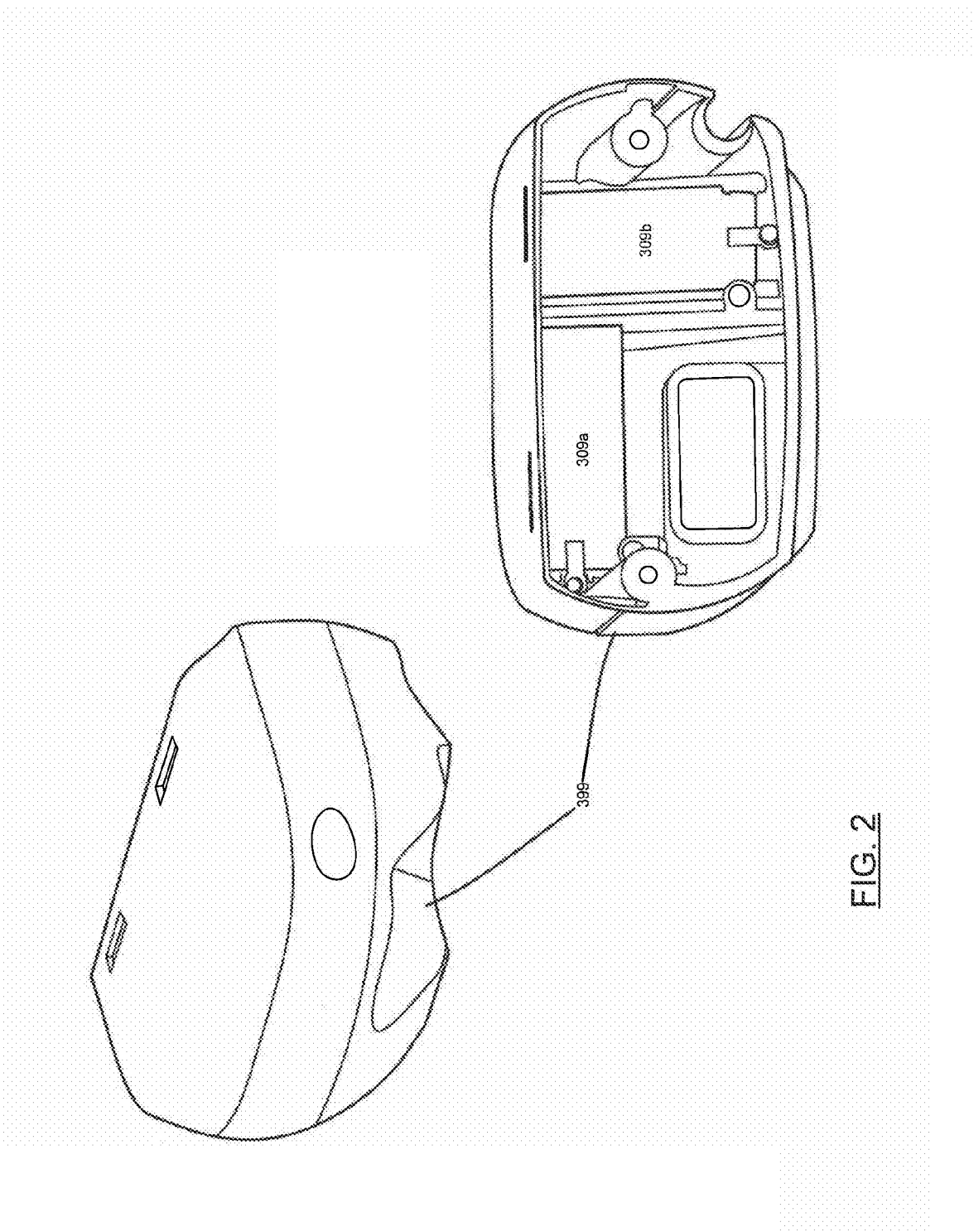

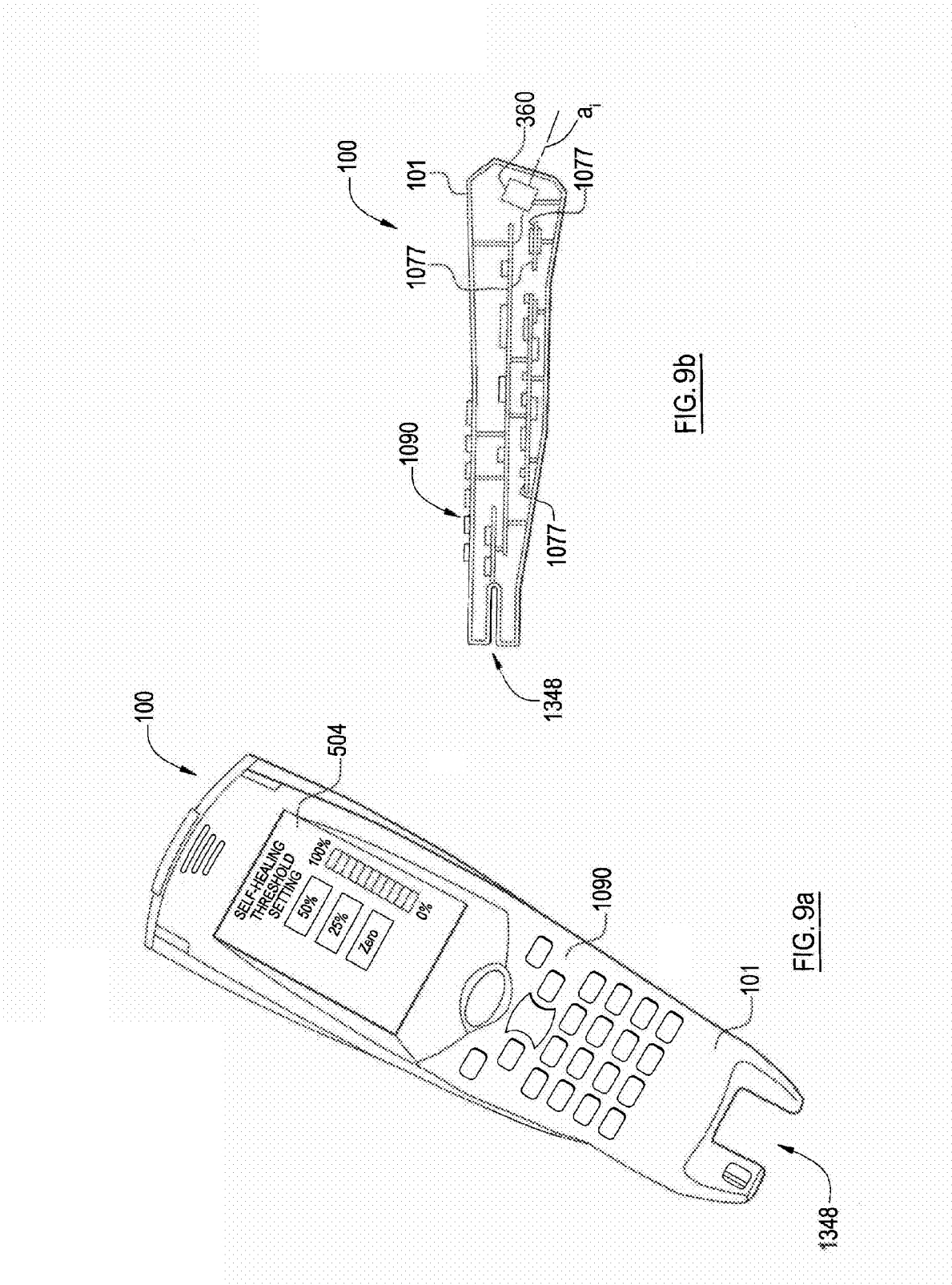

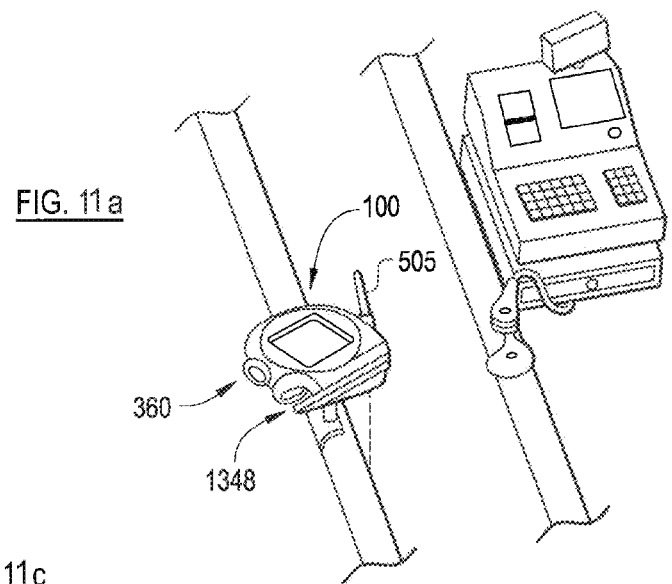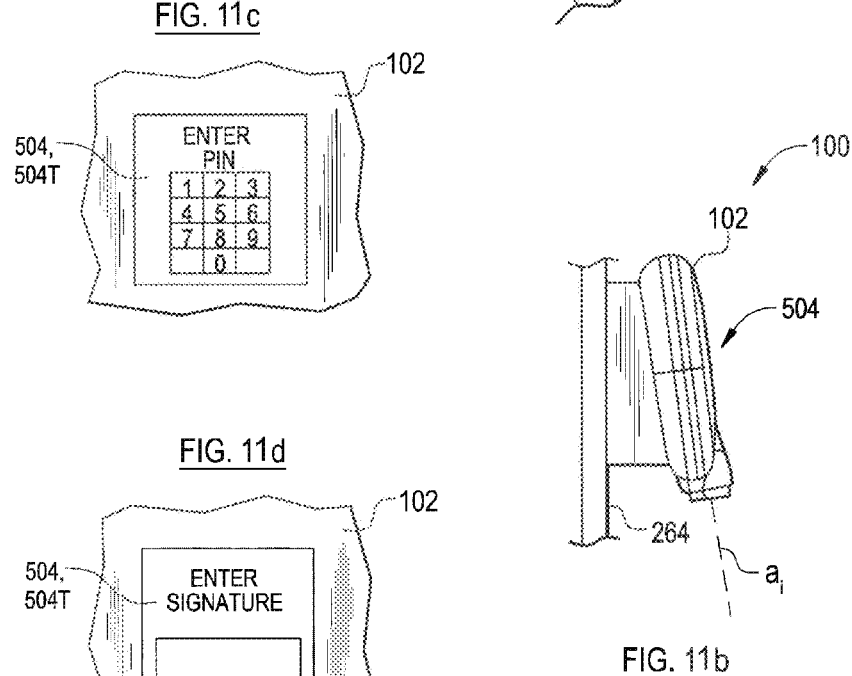

US 10,013,588 B2

ENCODED INFORMATION READING TERMINAL WITH MULTI-DIRECTIONAL ANTENNA

FIELD OF THE INVENTION

The invention is generally related to encoded information reading (EIR) terminals and is specifically related to EIR terminals using radio frequency identifier (RFID) reading devices with multi-directional antennas.

BACKGROUND OF THE INVENTION

RFID methods are widely used in a number of applications, including smart cards, item tracking in manufacturing and retail, etc. An RFID tag can be attached, e.g., to a retail item. An encoded information reading (EIR) terminal deployed at the cashier's desk can be equipped with an RFID reader to read and/or modify the memory of an RFID tag attached to a retail item.

SUMMARY OF THE INVENTION

In one embodiment, there is provided an EIR terminal comprising a microprocessor, a memory communicatively coupled to the microprocessor, an RFID reading device, and two or more antennas having substantially different spatial orientation. Each antenna can be electrically coupled to a switching circuit. The switching circuit can be configured to alternatively electrically couple each antenna of said two or more antennas to the RFID reading device. The RFID reading device can be configured to output raw message data containing an encoded message and/or to output decoded message data corresponding to an encoded message.

In another embodiment, there is provided an EIR terminal comprising a microprocessor, a memory communicatively coupled to the microprocessor, an RFID reading device, an antenna, and a mechanical rotor configured to change a spatial orientation of said antenna. The RFID reading device can be configured to output raw message data containing an encoded message and/or to output decoded message data corresponding to an encoded message.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 2 illustrates an exemplary embodiment of antennas mounted within a housing component of an EIR terminal;

FIGS. 9a and 9b illustrate an exemplary hand held EIR terminal housing;

FIGS. 11a-11d illustrate exemplary deployments of an EIR terminal within a retail store.

The drawings are not necessarily to scale, emphasis instead generally being placed upon illustrating the principles of the embodiments described herein. In the drawings, like numerals are used to indicate like parts throughout the various views.

DETAILED DESCRIPTION OF THE INVENTION

In one embodiment, there is provided an encoded information reading (EIR) terminal comprising a radio frequency identifier (RFID) reading device. The EIR terminal can be configured to read RFID tags containing encoded messages. In one embodiment, the RFID terminal can be configured to read an RFID tag containing an encoded message and output raw message data containing the encoded message. In another embodiment, the RFID terminal can be configured to read an RFID tag containing an encoded message and output decoded message data corresponding to the encoded message.

Various embodiments of the EIR terminal can be used in a numerous applications, including but not limited to, authentication and access control systems (for example, using smart cards), item tracking in manufacturing and retail, etc. A smart card is an identification card (e.g., a credit card, a pass card) which does not need to be swiped or otherwise physically contacted by a card reader. This capability can be implemented by placing an RFID tag in the card. Item tracking can be implemented by placing an RFID tag on each individual item. In retail, item tracking with RFID tags can be used in conjunction with other technologies such as bar code scanning and payment terminals. Item tracking with RFID tags can be used in loss prevention systems by placing an RFID tag into merchandise items and placing sensors at exit points. If an exit sensor detects a tagged item with a tag, which was not deactivated at the checkout, an alarm can go off.

One of the most important operational characteristics of an RFID reading device is the distance at which an RFID tag can be read. One of the factors significantly affecting the read range is mutual orientation of the RFID tag and the RFID reader antenna. Changing the orientation of an RFID tag and/or an RFID reader antenna can dramatically change the tag read range by the RFID reader, for example within the range of 1-50 feet.

Figure 1A:
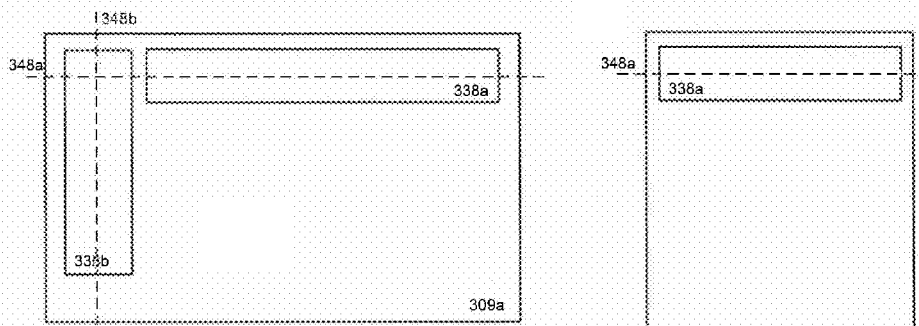
FIGS. 1a-1c illustrate one embodiment of RFID reading device antennas.
Figure 1C:
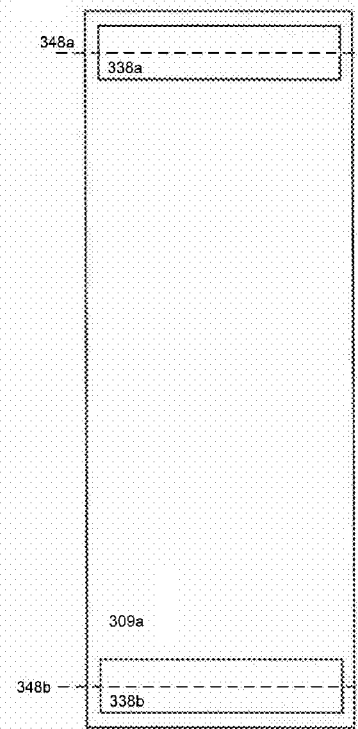
Figure 1B:
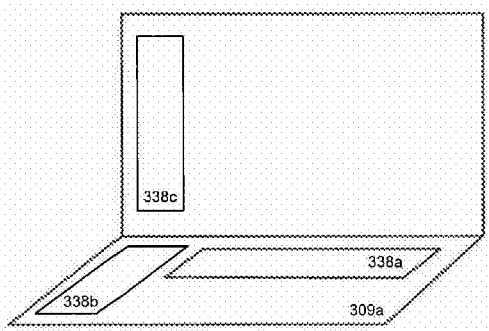

To provide consistent read range independent of the orientation of the RFID tag and/or the EIR terminal, in one embodiment the EIR terminal can comprise at least two antennas having substantially different spatial orientation and/or spaced apart from each other by a distance comparable to the antenna size, and can be configured to automatically switch between the antennas. In one embodiment, the antennas can be mounted/printed on a single printed circuit board (PCB). In an illustrative embodiment, schematically shown in FIG. 1a, the first antenna 338a and the second antenna 338b can be mounted/printed on a PCB 309a. The respective longitudinal axis 348a, 348b of antennas 338a and 338b can be substantially mutually orthogonal. In another illustrative embodiment, schematically shown in FIG. 1b, a third antenna 338c can be mounted/printed on a second PCB 309b and can be disposed substantially orthogonal to the first antenna 338a and to the second antenna 338b. In a yet another illustrative embodiment, schematically shown in FIG. 1c, the first antenna 338a and the second antenna 338b can be mounted/printed on a PCB 309a. The respective longitudinal axis 348a, 348b of antennas 338a and 338b can be substantially parallel, and spaced apart by a distance comparable with the antenna size.

In another illustrative embodiment, schematically shown in FIG. 2, the first antenna and the second antenna can be mounted or printed on PCBs 3010a and 3010b, respectively. PCBs 3010a and 3010b can be mounted within a housing component 399 of a hand held EIR terminal. A skilled artisan would appreciate the fact that other spatial orientations of two or more antennas are within the scope of this disclosure.

In one example, an RFID reader with a vertically disposed antenna can read a vertically disposed RFID tag within the range of up to 35 inches, and can read a horizontally disposed RFID tag within the range of up to 13 inches, while an RFID reader with a horizontally disposed antenna can read a horizontally disposed RFID tag within the range of up to 32 inches, and can read a vertically disposed RFID tag within the range of up to 15 inches. Hence, by employing two antennas substantially orthogonal to each other and/or spaced apart by a distance comparable with the antenna size, a consistent read range can be provided, independent of the mutual orientation of the RFID reading device and the RFID tag.

Figure 3:
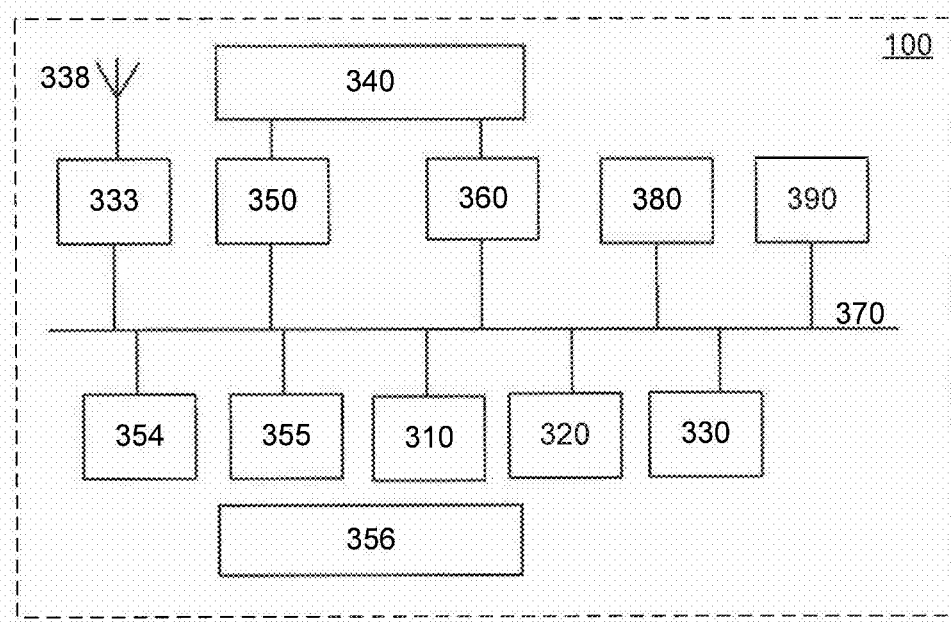
FIG. 3 illustrates a component-level diagram of one embodiment of an EIR terminal.

Component-level diagram of one embodiment of an EIR terminal is now being described with references to FIG. 3. EIR terminal 100 can comprise at least one microprocessor 310 and a memory 320, both coupled to the system bus 370. The microprocessor 310 can be provided by a general purpose microprocessor or by a specialized microprocessor (e.g., an ASIC). In one embodiment, EIR terminal 100 can comprise a single microprocessor which can be referred to as a central processing unit (CPU). In another embodiment, EIR terminal 100 can comprise two or more microprocessors, for example, a CPU providing some or most of the EIR terminal functionality and a specialized microprocessor performing some specific functionality. A skilled artisan would appreciate the fact that other schemes of processing tasks distribution among two or more microprocessors are within the scope of this disclosure.

EIR terminal 100 can further comprise a communication interface 340 communicatively coupled to the system bus 370. In one embodiment, the communication interface can be provided by a wireless communication interface. The wireless communication interface can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1×EV-DO protocol family.

EIR terminal 100 can further comprise a keyboard interface 354 and a display adapter 355, both also coupled to the system bus 370. EIR terminal 100 can further comprise a battery 356. In one embodiment, the battery 356 can be provided by a replaceable rechargeable battery pack.

EIR terminal 100 can further comprise a GPS receiver 380. EIR terminal 100 can further comprise at least one connector 390 configured to receive a subscriber identity module (SIM) card.

EIR terminal 100 can further comprise one or more EIR devices 330, provided, for example, but not limited to, by an RFID reading device, a bar code reading device, or a card reading device. In one embodiment, the RFID terminal can be configured to read an encoded message using EIR device 330, and to output raw message data containing the encoded message. In another embodiment, the RFID terminal can be configured to read an encoded message using EIR device 330, and to output decoded message data corresponding to the encoded message. As used herein, "message" is intended to denote a character string comprising alphanumeric and/or non-alphanumeric characters. An encoded message can be used to convey information, such as identification of the source and the model of a product, for example, in a UPC code.

Of course, devices that read bar codes, read RFID, or read cards bearing encoded information may read more than one of these categories while remaining within the scope of this disclosure. For example, a device that reads bar codes may include a card reader, and/or RFID reader; a device that reads RFID may also be able to read bar codes and/or cards; and a device that reads cards may be able to also read bar codes and/or RFID. For further clarity, it is not necessary that a device's primary function involve any of these functions in order to be considered such a device; for example, a cellular telephone, smartphone, or PDA that is capable of reading bar codes is a device that read bar codes for purposes of this disclosure.

As noted herein supra, in one embodiment, EIR terminal 100 can further comprise an RFID reading device 333. EIR terminal 100 can be configured to read RFID tags containing decoded messages. In one embodiment, the RFID terminal can be configured to read, using RFID reading device 333, an RFID tag containing an encoded message, and to output raw message data containing the encoded message. In another embodiment, the RFID terminal can be configured to read, using RFID reading device 333, an RFID tag containing an encoded message, and to output decoded message data corresponding to the encoded message.

In one embodiment, RFID reading device 333 can be compliant with EPC™ Class-1 Generation-2 UHF RFID Protocol for Communications at 860 MHz-960 MHz by EPCglobal, commonly known as the "Gen 2" standard, which defines physical and logical requirements for a passive-backscatter, Interrogator-talks-first (ITF) RFID system operating in the 860 MHz-960 MHz frequency range.

In one embodiment, EIR terminal 100 can transmit information to a passive RFID tag by modulating an RF signal in the 860-960 MHz frequency range. An RFID tag can receive both information and operating energy from the RF signal transmitted by EIR terminal 100. EIR terminal 100 can receive information from the RFID tag by transmitting a continuous-wave (CW) RF signal to the RFID tag. "Continuous wave" can refer to any waveform transmitted by an RFID reading device and suitable to power a passive RFID tag, e.g., a sinusoid at a given frequency. The RFID tag can respond by modulating the reflection coefficient of its antenna, thus backscattering an information signal to the EIR terminal 100. In one embodiment, the RFID tag can modulate the reflection coefficient of its antenna only responsive to receiving an RFID signal from EIR terminal 100.

In a further aspect, EIR terminal 100 can be configured to send information to one or more RFID tags by modulating an RF carrier using double-sideband amplitude shift keying (DSB-ASK), single-sideband amplitude shift keying (DSB-ASK), or phase-reversal amplitude shift-keying (PR-ASK)

using a pulse-interval encoding (PIE) format. RFID tags can receive their operating energy from the same modulated RF carrier.

EIR terminal 100 can be configured to receive information from an RFID tag by transmitting an unmodulated RF carrier and listening for a backscatter reply. RFID tags can transmit information by backscatter-modulating the amplitude and/or phase of the RFID carrier. RFID tags can encode the backscattered data using, e.g., FM0 baseband or Miller modulation of a subcarrier at the data rate. The encoding method to be employed by an RFID tag can be selected by EIR terminal 100.

In another aspect, the communication link between EIR terminal 100 and an RFID tag can be half-duplex, meaning that the RFID tag is not required to demodulate EIR terminal's commands while backscattering. A half-duplex system means communication in both directions, but only one direction at a time (not simultaneously). Typically, once a party begins receiving a signal, it must wait for the transmitter to stop transmitting, before replying.

In another aspect, EIR terminal can establish one or more sessions with one or more RFID tags. An RFID tag can support at least one session-dependent flag for every session. The session-dependent flag can have two states. An RFID tag can invert a session-dependent flag responsive to receiving a command from EIR terminal 100. Tag resources other than session-dependent flags can be shared among sessions. In another aspect, an RFID tag can support a selected status flag indicating that the tag was selected by EIR terminal 100.

Responsive to receiving an interrogation signal transmitted by EIR terminal 100, an RFID tag can transmit a response signal back to EIR terminal 100. The response signal can contain useful data, e.g., an Electronic Product Code (EPC) identifier, or a tag identifier (TID). The response signal can include a representation of a binary string, at least part of which is equal to at least part one of the specified one or more target item identifiers.

In one embodiment, EIR terminal can implement EPC™ Class-1 Generation-2 UHF RFID Protocol for Communications at 860 MHz-960 MHz by EPCglobal. EIR terminal 100 can interrogate RFID tags using the commands described herein infra.

Select command can be used by EIR terminal 100 to select a particular RFID tag population for the subsequent inventory round. Select command can be applied successively to select a particular tag population based on user-specified criteria. Select command can include the following parameters:

Target parameter indicates whether Select command modifies a tag's SL flag or Inventoried flag, and in the latter case it further specifies one of four available sessions (S0, . . . , S3);

Action parameter indicates whether matching tags assert or deassert SL flag, or set their Inventoried flag to A or B state; tags conforming to the contents of MemBank, Pointer, Length, and Mask parameters are considered to be matching;

Mask parameter contains a bit string that a tag should compare to a memory location specified by MemBank, Pointer, and Length parameters;

MemBank parameter specifies the memory bank to which Mask parameter refers (EPC, TID, or User);

Pointer parameter specifies a memory start location for Mask;

Length parameter specifies the number of bits of memory for Mask; if Length is equal to zero, all tags are considered matching.

Inventory command set can be used by EIR terminal 100 to single out one or more individual tags from a group. A tag can maintain up to four simultaneous sessions and a binary Inventoried flag for each session. Inventory command set includes the following commands:

Query command can be used to initiate and specify an inventory round; it contains a slot counter value (Q=0 to 15) determining the number of slots in the round; the command also includes Sel parameter specifying which tags should respond to the Query.

QueryAdjust command can be used to adjust the value of the tag's slot counter Q without changing any other parameters;

QueryRep command can be used to repeat the last Query command;

Ack command can be used to acknowledge a tag's response;

NAK command can be used to force a tag to change its state to Arbitrate.

An RFID tag can implement a state machine. Once energized, a tag can change its current state to Ready. A selected tag can, responsive to receiving Query command, select a random integer from the range of $[0; 2^{Q-1}]$. If the value of zero is selected, the tag can transition to Reply state, backscaterring a 16-bit random number. If a non-zero value is selected, the tag can load the selected random integer into its slot counter and change its state to Arbitrate.

Responsive to receiving the tag transmission, EIR terminal can acknowledge it with Ack command containing the same random number. Responsive to receiving Ack command, the tag can change its state to Acknowledged and backscatter its protocol control (PC) bits, EPC and cyclic redundancy check (CRC) value. Unacknowledged tag can select a new random integer from the range of $[0; 2^{Q-1}]$, load the value into its slot counter, and change its state to Arbitrate. Responsive to receiving QueryAdjust command, a tag in the Arbitrate state should decrement the value of its slot counter and backscatter its protocol control (PC) bits, EPC and CRC value if its slot counter is equal to zero.

Responsive to receiving the tag's transmission of its PC, EPC and 16-bit CRC value, EIR terminal can send a QueryAdjust command causing the tag to invert its Inventoried flag and to transition to Ready state.

Access command set can be used by EIR terminal 100 for communicating with (reading from and writing to) a tag. An individual tag must be uniquely identified prior to access. Access command set includes the following commands:

ReqRn command can be used by EIR terminal 100 to request a handle from a tag; the handle can be used in the subsequent Access command set commands. Responsive to receiving Req_RN commands, a tag returns a 16-bit random integer (handle) and transitions from Acknowledged to Open or Secured state.

Read command can be used by EIR terminal 100 to read tag's Reserved, EPC, TID and User memory;

Write command can be used by EIR terminal 100 to write to tag's Reserved, EPC, TID and User memory;

Kill command can be used by EIR terminal 100 to permanently disable a tag;

Lock command can be used by EIR terminal 100 to lock passwords preventing subsequent read or write operations; lock individual memory banks preventing subsequent write operations; permanently lock the lock status of passwords or memory banks;

Access command can be used by EIR terminal 100 to cause a tag having a non-zero access password to transition from Open to Secured state.

A skilled artisan would appreciate the fact that other methods of interrogating RFID tags by EIR terminal 100 are within the scope of this disclosure.

As noted herein supra, in one embodiment, EIR terminal 100 can comprise at least two antennas 338a-338b feeding RF signals to RFID reading device 333 and having different spatial orientation. In one embodiment, antennas 338a-338b can be made of a metamaterial (MTM). Metamaterials are artificial composite materials engineered to produce a desired electromagnetic behavior which surpasses that of natural materials. MTM-based objects can include structures which are much smaller than the wavelength of electromagnetic waves propagating through the material. MTM technology advantageously allows for precise control of the propagation of electromagnetic waves in the confines of small structures by determining the values of operating parameters which can include operating frequency, bandwidth, phase offsets, constant phase propagation, and matching conditions.

In one aspect, an MTM antenna can be physically small as compared to other types of antennas: an MTM antenna can be sized, for example, on the order of one tenths of a signal's wavelength, while providing performance equal to or better than an antenna made of a conventional material and sized on the order of one half of the signal's wavelength. Thus, for a frequency range of 860 MHz-930 MHz, an antenna made of a conventional material should have the size of approximately 165 mm for a dipole antenna (or 82.5 mm for a monopole antenna), while a M™ antenna can have a size of 33 mm.

The ability of an MTM antenna to produce a desired electromagnetic behavior can be explained by the fact that while most natural materials are right-handed (RH) materials (i.e. propagation of electromagnetic waves in natural materials follows the right-hand rule for the trio (E, H, β), where E is the electrical field, H is the magnetic field, and β is the phase velocity) exhibiting a positive refractive index, a metamaterial due to its artificial structure can exhibit a negative refractive index and follow the left-hand rule for the trio (E, H, β). A metamaterial exhibiting a negative refractive index can be a pure left-handed (LH) metamaterial by simultaneously having negative permittivity and permeability. A metamaterial can combine RH and LH features (Composite Right and Left Handed (CRLH) materials).

Figure 4:
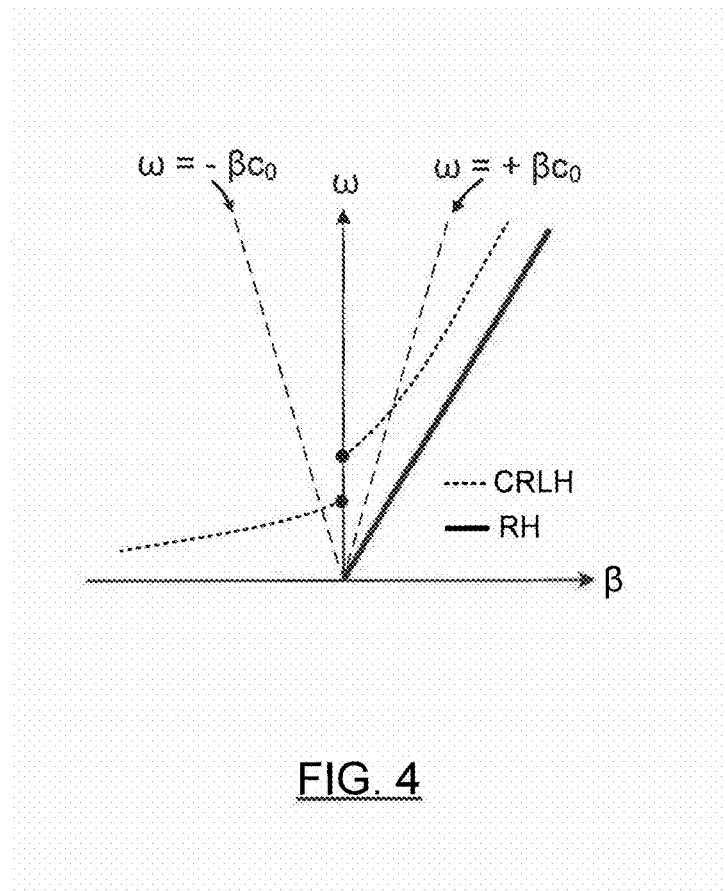
FIG. 4 illustrates an example of a graph of a composite left/right-handed phase constant.

Electromagnetic metamaterials can be synthesized by embedding various constituents with novel geometric shapes such as transmission line and split ring resonator into some host media (e.g., a PCB board). A transmission line can combine series capacitance ($C_L$) and shunted inductance ($L_L$), and can have the left-hand properties which can support backward wave with propagation phase constant. Since pure left-hand transmission line does not exist due to parasitic right-hand capacitors ($C_R$) and inductors ($L_R$) occurring in fabrication processes, a realizable transmission line approach can be a Composite Right/Left-hand (CRLH) transmission line with propagation phase constant β shown in FIG. 4. At low frequencies a CRLH transmission line can support a backward wave showing left-hand properties, while at high frequencies it can support a forward wave showing right-hand properties. A CRLH transmission line can exhibit properties not dependant upon resonance, and can have low loss and broad band performance.

Figure 5A:
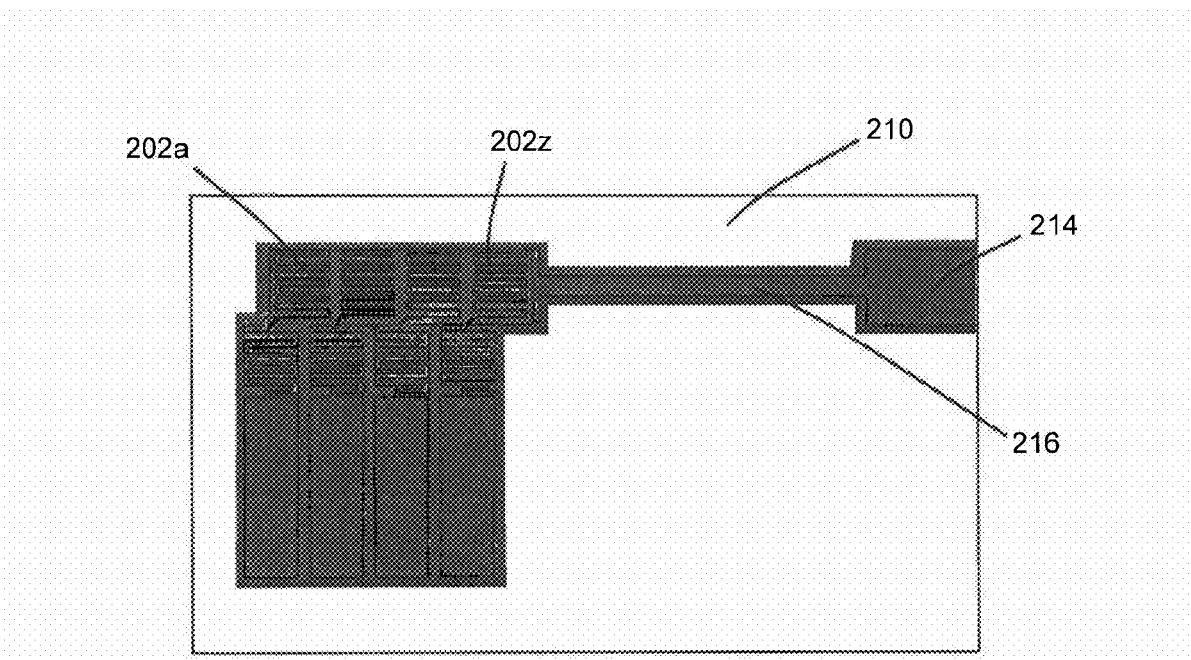
FIGS. 5a-5b illustrate various embodiments of multiple cell metamaterial (MTM) antennas suitable for an EIR terminal.
Figure 5B:
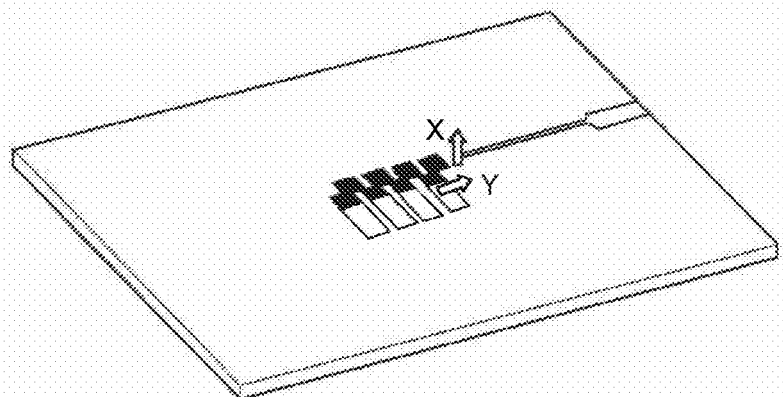

In one embodiment, antenna 338 can be provided by a multiple-cell transmission line MTM antenna shown in FIGS. 5a (top view) and 5b (3D view). Antenna 338 can comprise one or more conductive cell patches 202a-202z that can be mounted/printed on a dielectric substrate, provided, for example, by a printed circuit board (PCB) 210. Conductive cell patches 202a-202z can be spatially separated so that capacitive couplings between adjacent cell patches can be created. Also disposed on the dielectric substrate 210 can be a feed pad 214 that can be provided, e.g., by a metallic plate and can be connected to a conductive feed line 216. Conductive feed line 216 can be provided, e.g., by metallic a strip. Conductive feed line 216 can be located close but separately from conductive cell patches 202a-202b. A skilled artisan would appreciate the fact that MTM antennas having two or more conductive feed lines are within the scope of this disclosure. A ground plane can be provided by a metallic layer disposed on the bottom side of PCB 210 (not shown in FIG. 5a). Each cell patch can be connected to the ground plane by a via.

Figure 6:
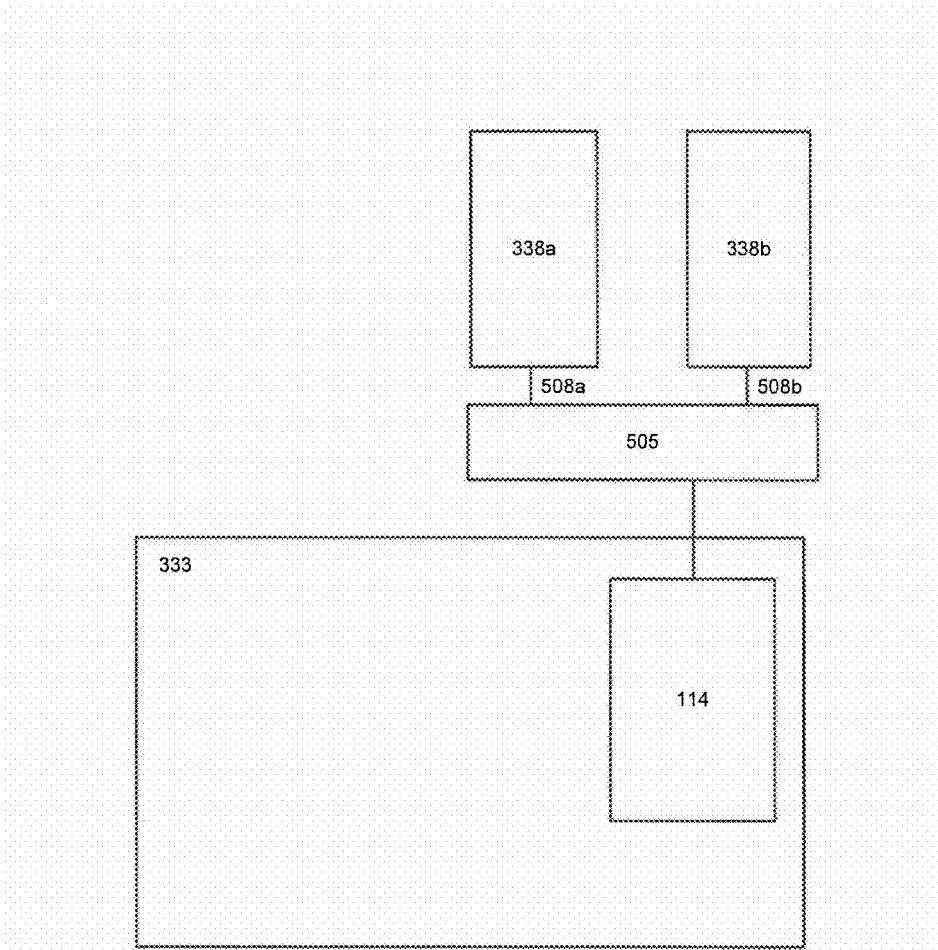
FIG. 6 illustrates one embodiment of an EIR terminal comprising two metamaterial antennas.

In one embodiment, schematically shown in FIG. 6, antenna 338a can be electrically coupled to a switching circuit 505 by a feed line 508a, and antenna 338b can be electrically coupled to the switching circuit 505 by a first feed line 508b. Switching circuit 505 can be configured to alternatively electrically couple each of antennas 338a and 338b to RFID front end 114.

In the illustrative embodiment of FIG. 6, switching circuit 505 can be configured to alternatively electrically couple each of antennas 338a and 338b to RFID front end 114 for a pre-defined period of time. In another embodiment (not shown in FIG. 6), the switching circuit can be configured to electrically couple each antenna of two or more antennas to the RFID front end in a pre-defined sequential manner for a pre-defined period of time. In one embodiment, the switching circuit can be configured to select the next antenna from a list of available antennas until the end of the list is reached, and then return to the first antenna. A skilled artisan would appreciate the fact that other pre-defined sequential manners of selecting an antenna are within the scope of this disclosure.

In a further aspect, switching circuit 505 of FIG. 6 can be configured to alternatively electrically couple each of antennas 338a and 338b to RFID front end 114 for a pre-defined period of time, until a signal strength exceeding a pre-defined threshold is detected. In one embodiment, the switching circuit can be configured to electrically couple each antenna of two or more antennas to the RFID front end in a pre-defined sequential manner for a pre-defined period of time, until a signal strength exceeding a pre-defined threshold is detected.

In another embodiment, switching circuit 505 of FIG. 6 can be configured to switch to the next antenna 338a, 338b responsive to establishing that the signal strength from the currently connected antenna is below a pre-defined threshold. In another embodiment, the switching circuit can be configured to switch to the next antenna of two or more antennas in a pre-defined sequential manner responsive to establishing that the signal strength from the currently connected antenna is below a pre-defined threshold.

Figure 7:
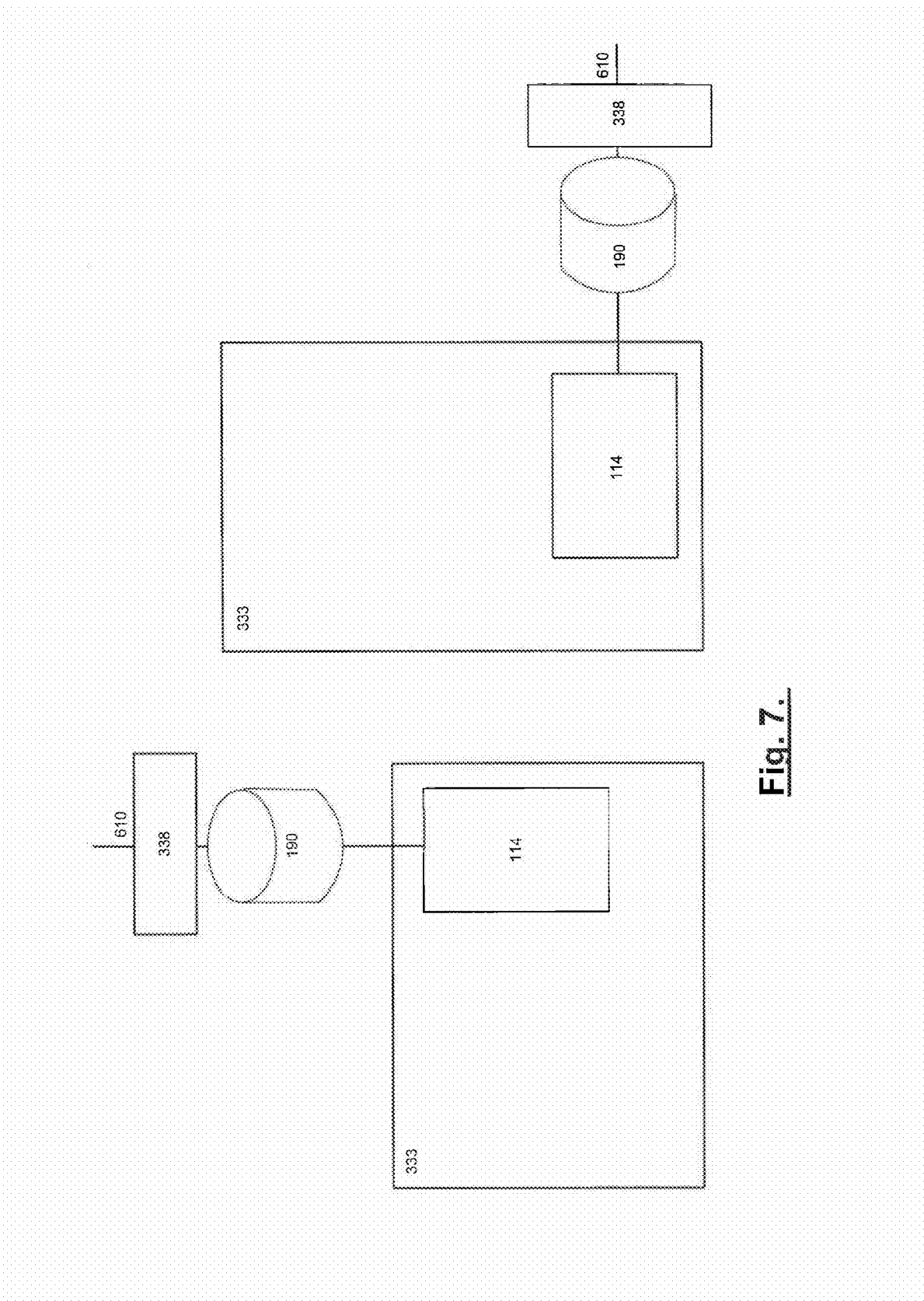
FIG. 7 illustrates one embodiment of EIR terminal comprising a metamaterial antenna and a mechanical rotor configured to change the spatial orientation of the antenna.

In a yet another embodiment schematically shown in FIG. 7, EIR terminal 100 can comprise a mechanical rotor 190 configured to rotate antenna 338. In one embodiment, mechanical rotor 190 can be configured to rotate antenna 338 around an axis 610 which can be substantially orthogonal to PCB on which antenna 338 is mounted/printed. In another embodiment, mechanical rotor 190 can be configured to rotate antenna 338 around an axis 610 which can be directed under an acute angle with respect to PCB on which antenna 338 is mounted/printed.

In a further aspect, mechanical rotor 190 can be configured to periodically rotate antenna 338 by a pre-defined angle around axis 610. In another embodiment, mechanical rotor 190 can be configured to periodically rotate antenna 338 by a pre-defined angle around axis 610, until a radio signal having a signal strength exceeding a pre-defined threshold is detected. In a yet another embodiment, mechanical rotor 190 can be configured to rotate antenna 338 by a pre-defined angle around axis 610 responsive to establishing that the current radio signal strength is below a pre-defined threshold.

Figure 8:
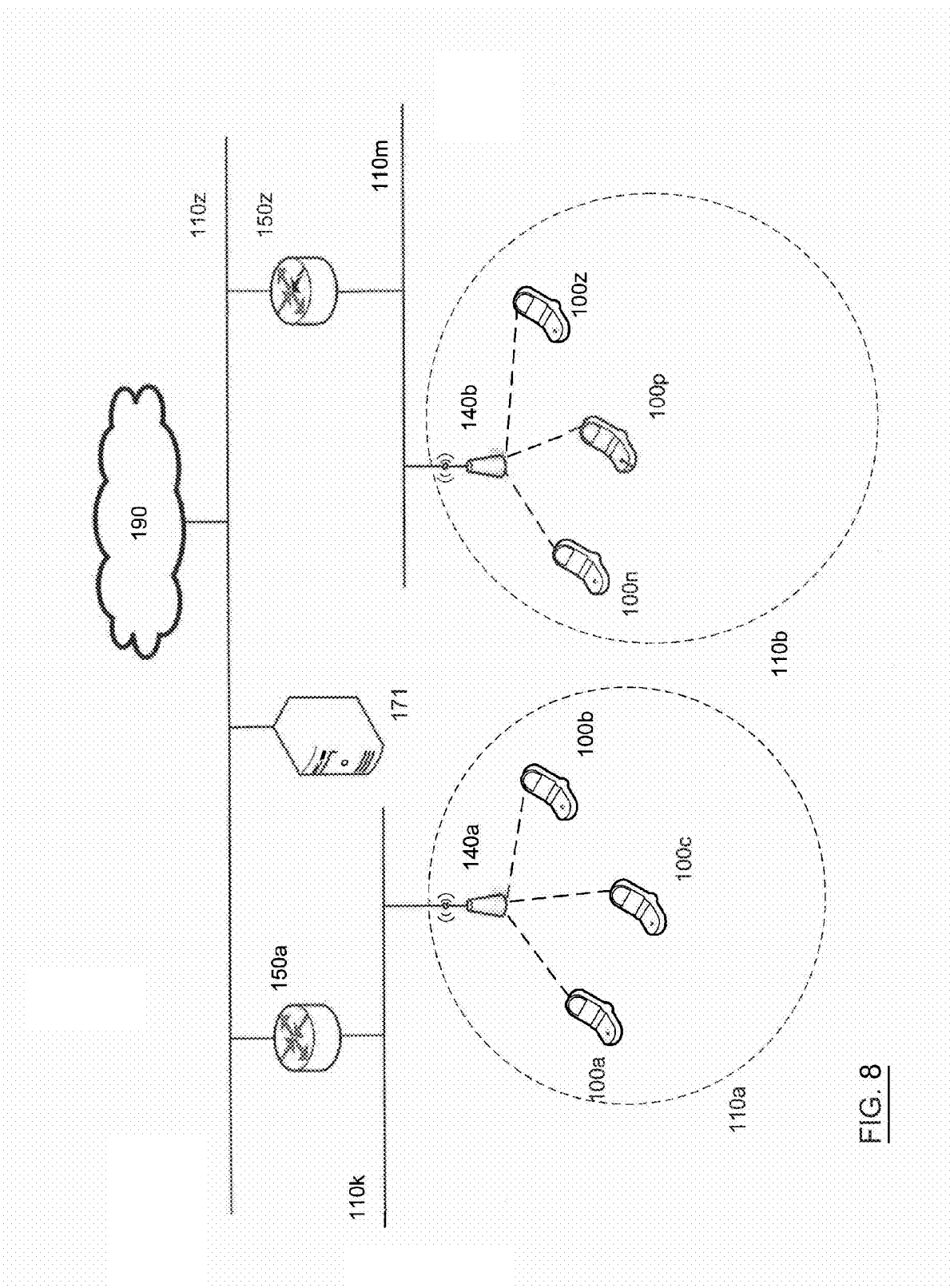
FIG. 8 depicts a network-level layout of a data collection system utilizing EIR terminals.

In another aspect, EIR terminal 100 can be incorporated in a data collection system. The data collection system, schematically shown in FIG. 8, can include a plurality of EIR terminals 100a-100z in communication with a plurality of interconnected networks 110a-110z. In one aspect, the plurality of networks 110a-110z can include at least one wireless communication network. EIR terminal 100c can establish a communication session with the host computer 171. In one embodiment, network frames can be exchanged by EIR terminal 100c and the host computer 171 via one or more routers, base stations, and other infrastructure elements. In another embodiment, the host computer 171 can be reachable by EIR terminal 100c via a local area network (LAN). In a yet another embodiment, the host computer 171 can be reachable by EIR terminal 100c via a wide area network (WAN). A skilled artisan would appreciate the fact that other methods of providing interconnectivity between EIR terminal 100c and the host computer 171 relying upon LANs, WANs, virtual private networks (VPNs), and/or other types of network are within the spirit and the scope of the invention.

In one embodiment, the communications between EIR terminal 100c and the host computer 171 can comprise a series of HTTP requests and responses transmitted over one or more TCP connections. In one embodiment, the communications between EIR terminal 100c and the host computer 171 can comprise VoIP traffic transmitted over one or more TCP and/or UDP ports. A skilled artisan would appreciate the fact that using other transport and application level protocols is within the scope and the spirit of the invention.

In one aspect, at least one of the messages transmitted by the EIR terminal can include decoded message data corresponding to, e.g., a bar code label or an RFID label attached to a product or to a shipment item. For example, an EIR terminal can transmit a request to the host computer to retrieve product information corresponding to a product identifier encoded by a bar code label attached to the product, or to transmit an item tacking record for an item identified by a bar code label attached to the product.

Form factors and housings for the EIR terminal according to the invention are now being described. The components of EIR terminal 100 can be incorporated into a variety of different housings. As indicated by the embodiment of FIGS. 9a and 9b, the components of FIG. 3 can be incorporated into a hand held housing 101. EIR terminal 100 of FIGS. 9a and 9b is in the form factor of a hand held portable data terminal. EIR terminal 100 as shown in FIGS. 9a and 9b can include a keyboard 1090, a display 504 having an associated touch screen overlay, a card reader 1348, and an imaging module 360 including image sensor array incorporated on an image sensor IC chip. As indicated by the side view of FIG. 9b, the components of the block diagram of FIG. 3 may be supported within housing 101 on a plurality of circuit boards 1077.

Figure 10A:
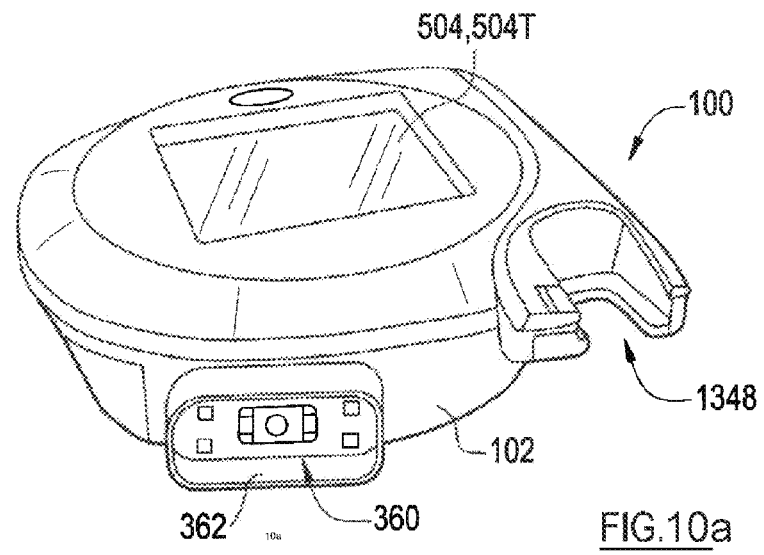
FIGS. 10a-10c illustrate an exemplary portable and remountable EIR terminal housing.
Figure 10B:
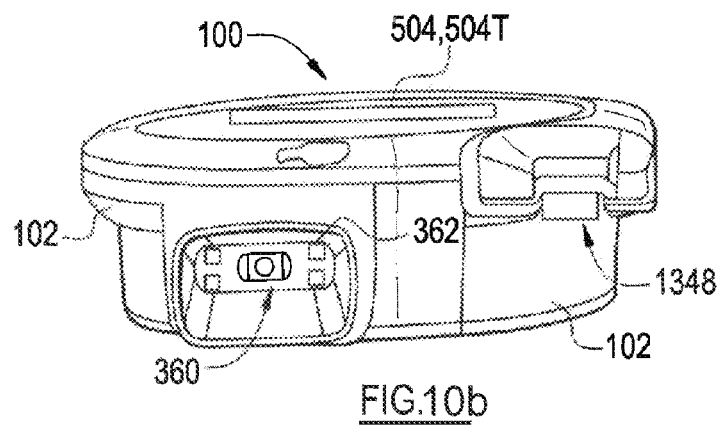
Figure 10C:
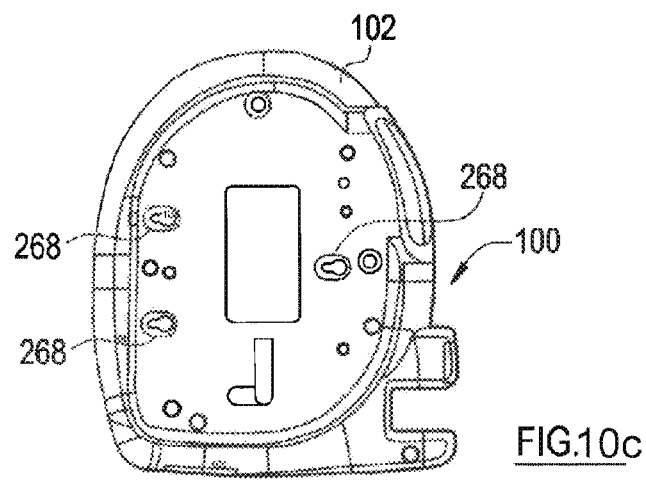

In the illustrative embodiments of FIGS. 10a-10c, the EIR terminal 100 is in the form of a transaction terminal which may be configured as a retail purchase transaction terminal or as a price verifier. Housing 102 of the transaction terminal shown in FIGS. 10a-10c is configured to be portable so that it can be moved from location to location and is further configured to be replaceably mounted on a fixed structure such as a fixed structure of a cashier station or a fixed structure of the retail store floor (e.g., a shelf, a column 264 best viewed in FIG. 11b). Referring to bottom view of FIG. 10c, the housing 102 of the EIR terminal 100 has formations 268 facilitating the replaceable mounting of EIR terminal 100 on a fixed structure. Referring now to FIG. 10b, EIR terminal 100 includes a display 504 having an associated touch screen 504T, a card reader 1348, an imaging module 360, and a luminous shroud 362. When light from the illumination block (not shown in FIG. 9) strikes luminous shroud 362, the shroud glows to attract attention to the location of imaging assembly.

In certain operating modes as indicated in FIG. 11c, the EIR terminal 100 in accordance with any of FIGS. 10a-10c, displays on display 504 a PIN entry screen prompting a customer to enter PIN information into touch screen 504T. In other operating modes, as indicated in FIG. 11d, the EIR terminal 100 displays on display 504 a signature prompt screen prompting a customer to enter signature information into the device with use of a stylus 505.

Referring to FIGS. 11a and 11b, various installation configurations for the EIR terminal of FIGS. 10a-10c are shown. In the view of FIG. 11a, the EIR terminal 100 is installed as a retail purchase transaction terminal at a point of sale cashier station. In the setup of FIG. 11a, the EIR terminal 100 is configured as a retail purchase transaction terminal and is utilized to aid and facilitate retail transactions at a point of sale. A customer may enter a credit card or a debit card into card reader 1348 and retail purchase transaction terminal may transmit the credit card information to credit/debit authorization network.

In the view of FIG. 11b, the EIR terminal 100 is configured as a price verifier to aid customers in checking prices of products located on a store floor. EIR terminal 100 may be mounted on a shelf (not shown in FIG. 11b) or on a column 264 or other fixed structure of the retail store. EIR terminal 100 may decode bar code data from bar codes on store products and transmit decoded out bar code messages to a store server for lookup of price information which is sent back from the store server to terminal 100 for display on display 504.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

A small sample of systems methods and apparatus that are described herein is as follows:

A1. An encoded information reading terminal comprising:
a microprocessor;
a memory communicatively coupled to said microprocessor;
a radio frequency identifier (RFID) reading device configured to perform at least one of: outputting raw message data containing an encoded message and outputting decoded message data corresponding to an encoded message;

two or more antennas, each antenna of said two or more antennas being electrically coupled to a switching circuit;

wherein said two or more antennas have substantially different spatial orientation; and wherein said switching circuit is configured to alternatively electrically couple each antenna of said two or more antennas to said RFID reading device.

A2. The encoded information reading terminal of A1, further comprising an encoded information reading (EIR) device selected from the group consisting of: a bar code reading device and a card reading device, said EIR device configured to perform at least one of: outputting raw message data containing an encoded message and outputting decoded message data corresponding to an encoded message.

A3. The encoded information reading terminal of A1, wherein said two or more antennas are provided by a first antenna and a second antenna; and wherein said first antenna is substantially orthogonal to said second antenna.

A4. The encoded information reading terminal of A1, wherein said two or more antennas are provided by a first antenna and a second antenna; and wherein said first antenna is spaced apart from said second antenna by a distance comparable with a size of said first antenna.

A5. The encoded information reading terminal of A1, wherein said two or more antennas are provided by metamaterial antennas.

A6. The encoded information reading terminal of A1, wherein at least one of: said first antenna, said second antenna is provided by at least one of: a patch cell array comprising one or more patch cells, a patch cell stack comprising two or more patch cells.

A7. The encoded information reading terminal of A1, wherein said two or more antennas are mounted/printed on one or more printed circuit boards (PCB).

A8. The encoded information reading terminal of A1, wherein said two or more antennas are provided by a first antenna mounted or printed on a first printed circuit board (PCB) and a second antenna mounted or printed on a second PCB; and wherein said first PCB and said second PCB are mounted within a housing component of said encoded information reading terminal.

A9. The encoded information reading terminal of A1, wherein said switching circuit is configured to electrically couple each antenna of said two or more antennas to said RFID front end for a pre-defined period of time in a pre-defined sequential manner.

A10. The encoded information reading terminal of A1, wherein said two or more antennas are provided by a first antenna and a second antenna; and wherein said switching circuit is configured to alternatively electrically couple said first antenna and said second antenna to said RFID front end for a pre-defined period of time.

A11. The encoded information reading terminal of A1, wherein said switching circuit is configured to electrically couple each antenna of said two or more antennas to said RFID front end for a pre-defined period of time in a pre-defined sequential manner, until a radio signal having a signal strength exceeding a pre-defined signal strength threshold is detected.

A12. The encoded information reading terminal of A1, wherein said two or more antennas are provided by a first antenna and a second antenna; and wherein said switching circuit is configured to alternatively electrically couple said first antenna and said second antenna to said RFID front end for a pre-defined period of time, until a radio signal having a signal strength exceeding a pre-defined signal strength threshold is detected.

A13. The encoded information reading terminal of A1, wherein said switching circuit is configured to electrically couple each antenna of said two or more antennas to said RFID front end in a pre-defined sequential manner responsive to establishing that a radio signal from a currently connected antenna has a signal strength below a pre-defined signal strength threshold.

A14. The encoded information reading terminal of A1, wherein said two or more antennas are provided by a first antenna and a second antenna; and wherein said switching circuit is configured to alternatively electrically couple said first antenna and said second antenna to said RFID front end responsive to establishing that a radio signal from a currently connected antenna has a signal strength below a pre-defined signal strength threshold.

B1. An encoded information reading terminal comprising:
a microprocessor;
a memory communicatively coupled to said microprocessor;
a radio frequency identifier (RFID) reading device configured to perform at least one of: outputting raw message data containing an encoded message and outputting decoded message data corresponding to an encoded message;
an antenna electrically coupled to said RFID reading device;
a mechanical rotor configured to change a spatial orientation of said antenna.

B2. The encoded information reading terminal of B1, further comprising an encoded information reading (EIR) device selected from the group consisting of: a bar code reading device and a card reading device, said EIR device configured to perform at least one of: outputting raw message data containing an encoded message and outputting decoded message data corresponding to an encoded message.

B3. The encoded information reading terminal of B1, wherein said antenna is provided by a metamaterial antenna.

B4. The encoded information reading terminal of B1, wherein said antenna is provided by at least one of: a patch cell array comprising one or more patch cells, a patch cell stack comprising two or more patch cells.

B5. The encoded information reading terminal of B1, wherein said rotor is configured to rotate said antenna around an axis substantially orthogonal to a printed circuit board on which said antenna is mounted/printed.

B6. The encoded information reading terminal of B1, wherein said rotor is configured to rotate said antenna around an axis directed under an acute angle with respect to a printed circuit board on which said antenna is mounted/printed.

B7. The encoded information reading terminal of B1, wherein said rotor is configured to periodically rotate said antenna by a pre-defined angle.

B8. The encoded information reading terminal of B1, wherein said rotor is configured to rotate said antenna by a pre-defined angle responsive to responsive to establishing that a radio signal from said antenna has a signal strength below a pre-defined signal strength threshold.

B9. The encoded information reading terminal of B1, wherein said rotor is configured to rotate said antenna by a pre-defined angle until a radio signal having a signal strength exceeding a pre-defined signal strength threshold is detected.

We claim:

1. An encoded information reading terminal comprising:
a radio frequency identifier (RFID) reader; and
one or more antennas operable in one of a first arrangement or a second arrangement, wherein said first arrangement comprises at least a first antenna and a second antenna electrically coupled to a switching circuit,
wherein at least said first and second antennas have substantially different spatial orientations, and said first antenna is spaced apart from said second antenna by a predetermined distance based on a size of said first antenna,
wherein said switching circuit is configured to alternatively electrically couple each antenna of at least said first and second antennas to said RFID reader for a pre-defined period of time, until a radio signal having a signal strength exceeding a pre-defined signal strength threshold is detected,
wherein said second arrangement comprises at least said first antenna electrically coupled to a mechanical rotor, wherein said mechanical rotor is configured to periodically rotate said first antenna by a first predetermined angle around an axis which is substantially orthogonal to a printed circuit board (PCB) on which said first antenna are mounted, and
wherein said mechanical rotor is further configured to rotate said first antenna around said axis directed under a second predetermined angle with respect to said PCB on which said first antenna is mounted.

2. The encoded information reading terminal of claim 1, further comprising an encoded information reading (EIR) device selected from the group consisting of: a bar code reading device and a card reading device, said EIR device configured to perform at least one of:
outputting raw message data containing an encoded message and outputting
decoded message data corresponding to an encoded message.

3. The encoded information reading terminal of claim 1, wherein said first antenna is substantially orthogonal to said second antenna.

4. The encoded information reading terminal of claim 3, wherein said one or more antennas further comprises a third antenna that is orthogonal to each of at least said first and second antenna; and
wherein said first antenna is spaced apart from said third antenna by a distance comparable with a size of said first antenna.

5. The encoded information reading terminal of claim 1, wherein at least said first and second antennas are provided by metamaterial antennas.

6. The encoded information reading terminal of claim 1, wherein at least one of: said first antenna, said second antenna is provided by at least one of: a patch cell array comprising one or more patch cells, a patch cell stack comprising two or more patch cells.

7. The encoded information reading terminal of claim 1, wherein said at least first and second antennas are mounted/printed on one or more PCBs.

8. The encoded information reading terminal of claim 1, wherein said first antenna is mounted or printed on a first PCB and said second antenna is mounted or printed on a second PCB; and
wherein said first PCB and said second PCB are mounted within a housing component of said encoded information reading terminal.

9. The encoded information reading terminal of claim 1, wherein said switching circuit is configured to electrically couple each antenna of at least said first and second antennas to said RFID reader for a pre-defined period of time in a pre-defined sequential manner.

10. The encoded information reading terminal of claim 1, wherein said one or more antennas further comprises a third antenna, and
wherein said switching circuit is configured to alternatively electrically couple said first antenna, said second antenna, and said third antenna to said RFID reader for a pre-defined period of time.

11. The encoded information reading terminal of claim 1, wherein said switching circuit is configured to alternatively electrically couple said first antenna and said second antenna to said RFID reader for a pre-defined period of time in a pre-defined sequential manner, until said radio signal having said signal strength exceeding said pre-defined signal strength threshold is detected.

12. The encoded information reading terminal of claim 1, wherein said switching circuit is configured to electrically couple each antenna of at least said first and second antennas to said RFID reader in a pre-defined sequential manner responsive to establishing that a radio signal from a currently connected antenna has a signal strength below a pre-defined signal strength threshold.

13. The encoded information reading terminal of claim 1, wherein said switching circuit is configured to alternatively electrically couple said first antenna and said second antenna to said RFID reader in a pre-defined sequential manner responsive to establishing that a radio signal from a currently connected antenna has a signal strength below a pre-defined signal strength threshold.

14. An encoded information reading terminal comprising:
a radio frequency identifier (RFID) reader;
an antenna electrically coupled to said RFID reader; and
a mechanical rotor configured to change a spatial orientation of said antenna, wherein said mechanical rotor is configured to rotate said antenna by a first predetermined angle around an axis which is substantially orthogonal to a printed circuit board (PCB) on which said antenna is mounted, and wherein said mechanical rotor is further configured to rotate said antenna around said axis directed under a second predetermined angle with respect to said PCB on which said antenna is mounted, and
wherein said mechanical rotor is further configured to rotate said antenna by said first predetermined angle and said second predetermined angle responsive to establishing that a radio signal from said antenna has a signal strength below a pre-defined signal strength threshold.

15. The encoded information reading terminal of claim 14, further comprising an encoded information reading (EIR) device selected from the group consisting of: a bar code reading device and a card reading device, said EIR device configured to perform at least one of: outputting raw message data containing an encoded message and outputting decoded message data corresponding to an encoded message.

16. The encoded information reading terminal of claim 14, wherein said antenna is provided by a metamaterial antenna.

17. The encoded information reading terminal of claim 14, wherein said antenna is provided by at least one of: a patch cell array comprising one or more patch cells, a patch cell stack comprising two or more patch cells.

18. The encoded information reading terminal of claim 14, wherein said rotor is configured to rotate said antenna around an axis substantially orthogonal to the PCB on which said antenna is mounted/printed.

19. The encoded information reading terminal of claim 14, wherein said mechanical rotor is configured to rotate said antenna by said second predetermined angle until a radio signal having a signal strength exceeding a pre-defined signal strength threshold is detected.

\* \* \* \* \*